United States Patent [19]
Yamamoto et al.

[11] Patent Number: 5,481,457
[45] Date of Patent: Jan. 2, 1996

[54] VEHICLE STEERING SYSTEM

[75] Inventors: Yorihisa Yamamoto; Yutaka Nishi; Takashi Nishimori; Hiroyuki Tokunaga, all of Saitama, Japan

[73] Assignee: Honda Giken Kogyo Kabushiki Kaisha, Tokyo, Japan

[21] Appl. No.: 218,116

[22] Filed: Mar. 25, 1994

[30] Foreign Application Priority Data

Jun. 4, 1993 [JP] Japan .................................. 5-158080

[51] Int. Cl.[6] ........................................ B62D 5/04
[52] U.S. Cl. .................... 364/424.05; 180/79.1; 280/735
[58] Field of Search ............... 364/424.05, 565; 180/79.2 R, 142, 140, 141; 303/111; 280/91, 727, 734, 735

[56] References Cited

U.S. PATENT DOCUMENTS

| | | | |
|---|---|---|---|
| 3,866,706 | 2/1975 | Lincke et al. | 180/79.2 R |
| 4,706,771 | 11/1987 | Kawabe et al. | 180/142 |
| 4,830,127 | 5/1989 | Ito et al. | 180/79.1 |
| 4,840,389 | 6/1989 | Kawabe et al. | 280/91 |
| 4,878,557 | 11/1989 | Shibahata et al. | 180/140 |
| 4,909,343 | 3/1990 | Mouri et al. | 180/142 |
| 4,966,249 | 10/1990 | Imaseki | 180/233 |
| 4,984,646 | 1/1991 | Sano et al. | 180/79.1 |
| 5,014,801 | 5/1991 | Hirose | 180/140 |
| 5,078,226 | 1/1992 | Inagaki et al. | 180/141 |
| 5,094,127 | 3/1992 | Ishida et al. | 477/108 |
| 5,097,917 | 3/1992 | Serizawa et al. | 180/79.1 |
| 5,225,984 | 7/1993 | Nakayama et al. | 364/424.05 |
| 5,236,335 | 8/1993 | Takeuchi et al. | 180/79.1 |
| 5,247,441 | 9/1993 | Serizawa et al. | 364/424.05 |
| 5,267,783 | 12/1993 | Inoue et al. | 303/111 |
| 5,268,841 | 12/1993 | Mouri | 364/424.05 |
| 5,274,576 | 12/1993 | Williams | 364/565 |

FOREIGN PATENT DOCUMENTS

| | | |
|---|---|---|
| 815080 | 6/1959 | United Kingdom. |
| 1411829 | 10/1975 | United Kingdom. |
| 2205541 | 12/1988 | United Kingdom. |

*Primary Examiner*—Kevin J. Teska
*Assistant Examiner*—Russell W. Frejd
*Attorney, Agent, or Firm*—Weiner, Carrier & Burt; Joseph P. Carrier; Irving M. Weiner

[57] ABSTRACT

Provided is a vehicle steering system which can substantially stabilize the lateral dynamic behavior of a vehicle with a simple control logic over the entire range of the vehicle speed. A steering torque proportional to a yaw rate and/or a lateral acceleration of the vehicle is applied to the steerable wheels to counteract a lateral deviation of the vehicle. To avoid the oscillatory or overshooting behavior of the control system, a damping torque is applied to the steering wheel. Thus, the counteracting steering torque is given as a mathematical function including a sum of a first term consisting of a product of a yaw rate and/or the lateral acceleration of the vehicle and a first coefficient, and a second term consisting of a product of an angular speed of the steering wheel and a second coefficient. In particular, the first coefficient and second coefficient are variable in a mutually proportional relationship so that the optimum selection of the first and second conditions can be done without any complication.

8 Claims, 9 Drawing Sheets

VEHICLE STEERING SYSTEM

TECHNICAL FIELD

The present invention relates to a steering system for vehicles, and in particular to a steering system which is adapted to automatically produce a steering torque so as to counteract the influences of external interferences or disturbances such as a crosswind on the behavior of the vehicle.

BACKGROUND OF THE INVENTION

When a vehicle encounters a disturbance such as a strong crosswind or side wind, and irregularities of the road surface, the vehicle tends to deviate from the intended path of travel. The steering system of a vehicle is often equipped with a power steering system which assists the manual steering input from the steering wheel with an output of an electric motor or a hydraulic motor. According to the conventional power steering system, the assisting torque is produced only when the vehicle operator has applied some steering torque to the steering wheel. Therefore, when the vehicle deviates from the intended straight path of travel due to crosswind, the electric or hydraulic motor will not produce any assisting torque unless the vehicle operator applies a steering torque which counteracts such a deviation.

Therefore, to prevent the deviation of the vehicle from the intended path, the vehicle operator must constantly apply a manual steering torque to the steering wheel. According to the conventional steering system, the assisting torque is generally small when the vehicle speed is high. Therefore, when the vehicle deviates from an intended path of travel, the steering input necessary to restore the vehicle to the intended path of travel becomes progressively greater as the travelling speed of the vehicle increases.

It was proposed in Japanese patent application No. 3-277023 corresponding to U.S. patent application Ser. No. 07/950,081, filed by the assignee of the present application to detect the irregular behavior of the vehicle caused by external disturbances from the yaw rate of the vehicle, and to produce a counteracting torque with the electric motor for power assist so as to control the behavior of the vehicle against the external disturbances. In other words, the counteracting torque is given as a product of a yaw rate and a control coefficient.

According to such a system, when the gain of the control system or the control coefficient is increased with the intention of enhancing the control action for a given yaw rate, if the vehicle operator releases the steering wheel, the angular movement of the steering wheel demonstrates a tendency to oscillate and overshoot. It is possible to control such oscillatory movement and overshooting of the steering wheel by applying a damping torque to the steering wheel which is given as a product of a damping coefficient and the angular speed of the steering wheel, and appropriately selecting damping coefficient. It is thus essential to properly select the gain of the system with respect to the yaw rate and the damping coefficient for the angular speed of the steering wheel if both a satisfactory control and a desirable attenuating property of the system are to be attained.

However, according the previously proposed control system, the gain for the yaw rate and the damping coefficient for the angular speed of the steering wheel had to be selected individually even though these two factors affect each other, and changing one of them would necessitate the readjustment of the other. For this reason, according to the previously proposed system, it was difficult to achieve both a satisfactory control and a desirable attenuating property of the system. It was also found by the inventors that the gain for the yaw rate must be changed according to the vehicle speed to ensure a satisfactory handling of the vehicle.

BRIEF SUMMARY OF THE INVENTION

In view of such problems of the previously proposed vehicle steering system and such recognition by the inventors, a primary object of the present invention is to provide a vehicle steering system which can substantially stabilize the lateral dynamic behavior of a vehicle with a simple control logic.

A second object of the present invention is to provide a vehicle steering system which provides an optimum performance over the entire range of the vehicle speed without complicating the control system.

According to the present invention, these and other objects can be accomplished by providing a vehicle steering system, comprising: manual steering means including a steering wheel for manually steering steerable wheels of a vehicle; power means for applying a steering torque to the steerable wheels; and control means for controlling the steering torque produced by the power means according to a value indicating a lateral dynamic behavior of the vehicle so as to control the lateral dynamic behavior of the vehicle against external disturbances; the lateral dynamic behavior including at least one of a yaw rate and a lateral acceleration of the vehicle, and the steering torque being given by a mathematical function including a sum of a first term consisting of a product of the value indicating a lateral dynamic behavior of the vehicle and a first coefficient, and a second term consisting of a product of an angular speed of the steering wheel and a second coefficient.

Thus, the lateral dynamic behavior of the vehicle can be fully controlled without sacrificing the stability of the steering system itself. In particular, if the first coefficient and second coefficient are variable in a mutually proportional relationship, the optimum selection of the first and second conditions can be done without any complication. For instance, the first coefficient may be changed in dependence on a travelling speed of the vehicle. Typically, the first coefficient linearly increases with a travelling speed of the vehicle in a low speed range, and takes a fixed value when the travelling speed of the vehicle exceeds a certain value.

It was also found that the handling of the vehicle substantially improves if a proportional constant between the first and second coefficients changes in dependence on a travelling speed of the vehicle. Most preferably, the proportional constant is zero in a low speed range, linearly increases with a travelling speed of the vehicle in a medium speed range, and takes a fixed value when the travelling speed of the vehicle exceeds a certain high value so that the steering system may not produce any unnecessary steering torque when the vehicle is stationary, and is turned on a turn-table of a parking garage or otherwise moved by conveying means and transportation means.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
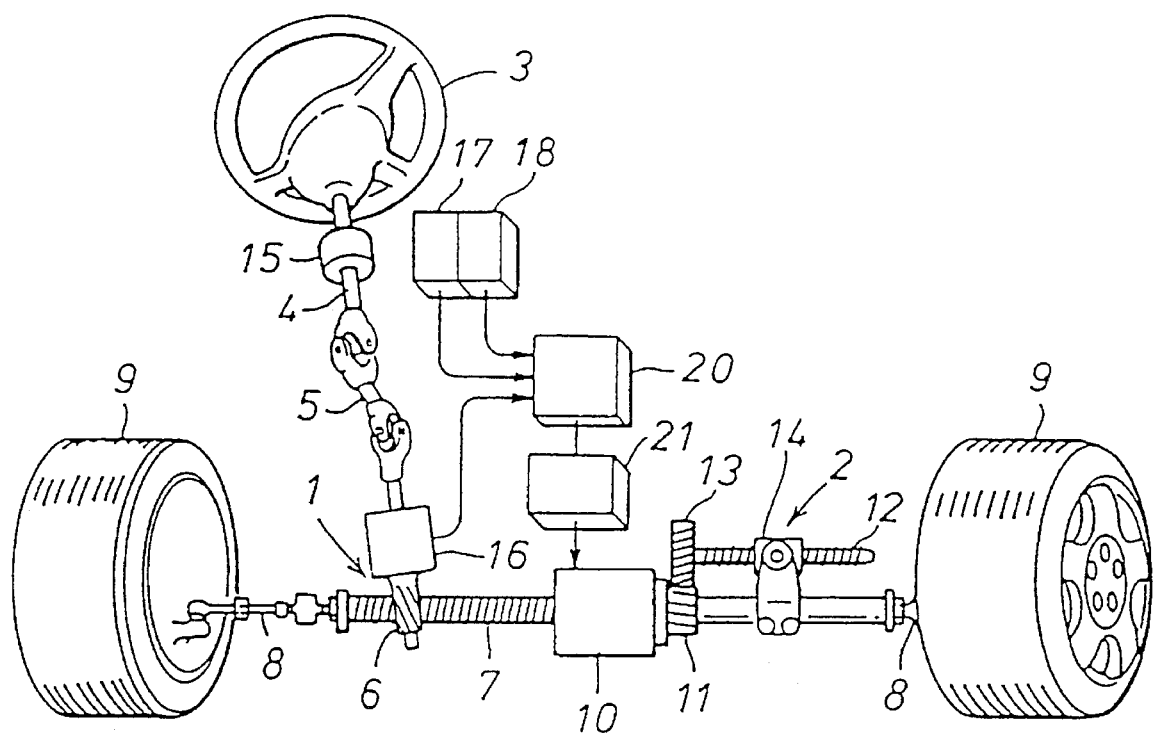
FIG. 1 is a schematic perspective view of a steering system to which the present invention is applied.

FIG. 1 shows the structure of a steering system for a vehicle according to the present invention. This system comprises a manual steering device 1 and an electric power steering device 2. A steering shaft 4 integrally connected to a steering wheel 3 at its upper end is connected, via a connecting shaft 5 and associated universal joints, to a pinion 6 of a rack and pinion mechanism. A rack 7 meshing with the pinion 6 extends laterally and is adapted to move laterally in either direction depending on the direction of the rotation of the pinion 6, and its two ends are connected to knuckle arms of front wheels 9 via tie rods 8, respectively. Thus, the normal manual steering action can be accomplished by using this rack and pinion mechanism.

An electric motor 10 is coaxially disposed around the rack 7. The electric motor 10 is provided with a hollow rotor through which the rack 7 is passed, and a helical drive gear 11 is mounted on the rotor. The helical drive gear 11 meshes with a helical driven gear 13 attached to an axial end of a screw shaft 12 of a ball screw mechanism disposed in parallel with the rack 7. The nut 14 of the ball screw mechanism is fixedly secured to the rack 7.

The steering shaft 4 is provided with a steering angle sensor 15 for producing a signal corresponding to the rotational angle of the steering wheel 3, and a torque sensor 16 for producing a signal corresponding to the input steering torque of the steering shaft 4.

The vehicle body carries thereon a lateral acceleration sensor (lateral G sensor) 17 for producing a signal corresponding to the lateral acceleration of the vehicle, a yaw rate sensor 18 for producing a signal corresponding to the yaw rate (yawing angular velocity) of the vehicle, and a vehicle speed sensor 19 for producing a signal corresponding to the travelling speed of the vehicle.

In this embodiment, the steering wheel 3 and the steerable wheels or the front wheels 9 are mechanically coupled, and the output torque of the electric motor 10 is controlled by feeding a control signal obtained by a control unit 20 according to the outputs from the sensors 15 through 19 to the electric motor 10 via a drive circuit 21.

Figure 2:
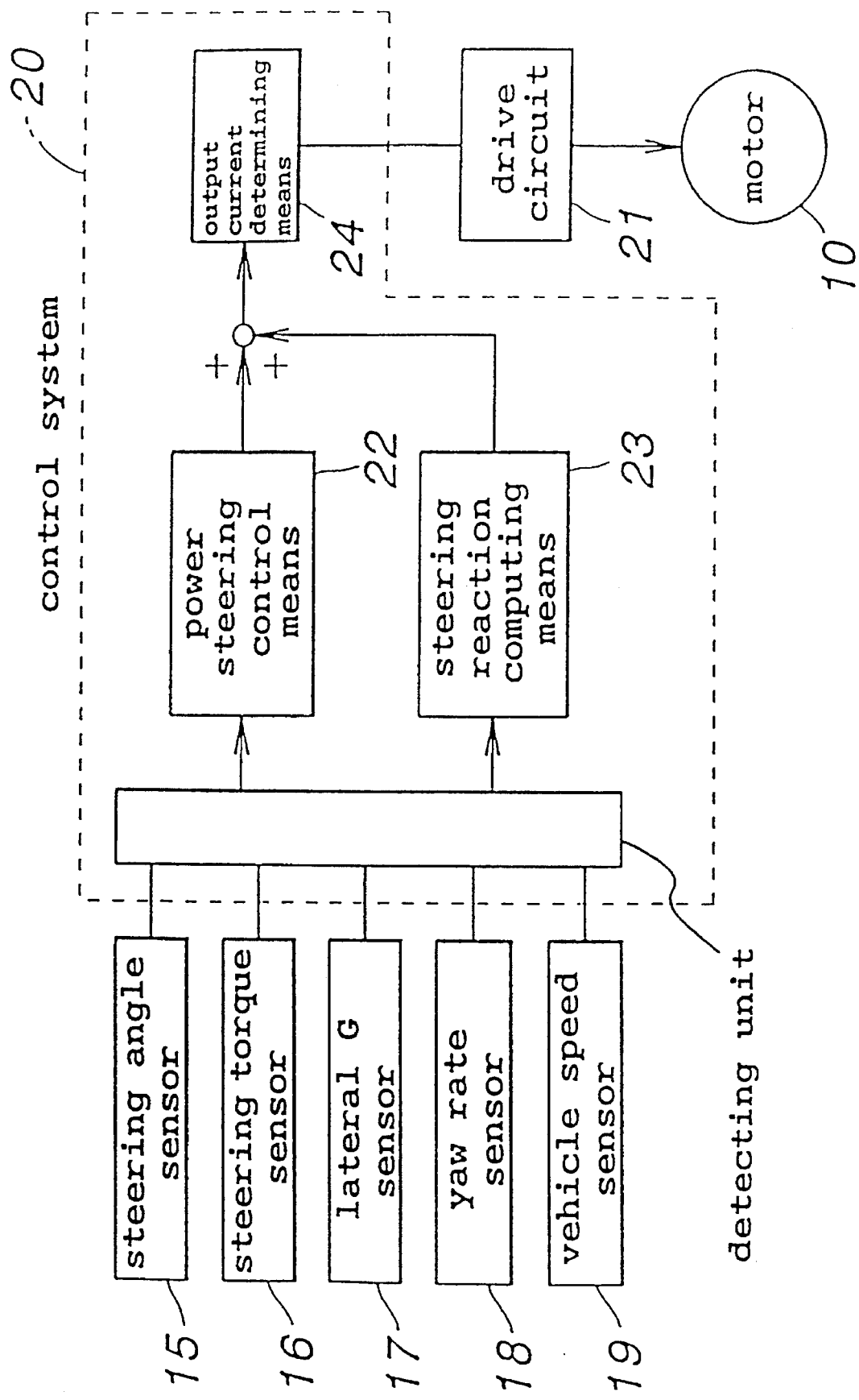
FIG. 2 is a block diagram of the control system for the vehicle steering system of the present invention.

FIG. 2 is a block diagram of the control system for the vehicle steering system according to the present invention. The control unit 20 receives the output signals from the steering angle sensor 15, the steering torque sensor 16, the lateral acceleration sensor 17, the yaw rate sensor 18, and the vehicle speed sensor 19. These signals are supplied to electric power steering control means 22 and active steering reaction computing means 23, and according to the output signals from these means output current determining means 24 determines a target current which is to be supplied to the electric motor 10.

The electric power steering control means 22 carries out the normal control action for assisting the manual steering input. This control means 22 determines a target steering torque value according to the lateral acceleration and the yaw rate according to the principle of the known electric power steering control.

In the active steering reaction computing means 23, a target steering reaction torque is determined by an algorithm which is described hereinafter according to the output signals from the sensors 15 through 19.

In the output current determining means 24, a target drive current signal is obtained as a value substantially proportional but opposite in phase to the deviation of the actual torque value obtained from the torque sensor from the target torque value.

The target drive current value thus obtained is supplied to the drive circuit 21. The drive circuit 21 controls the electric motor 10, for instance, by PWM control, and the actual electric current supplied to the electric motor 10 is detected by a current sensor and fed back to the input of the drive circuit 21 for comparing it with the target drive current value.

Figure 3:
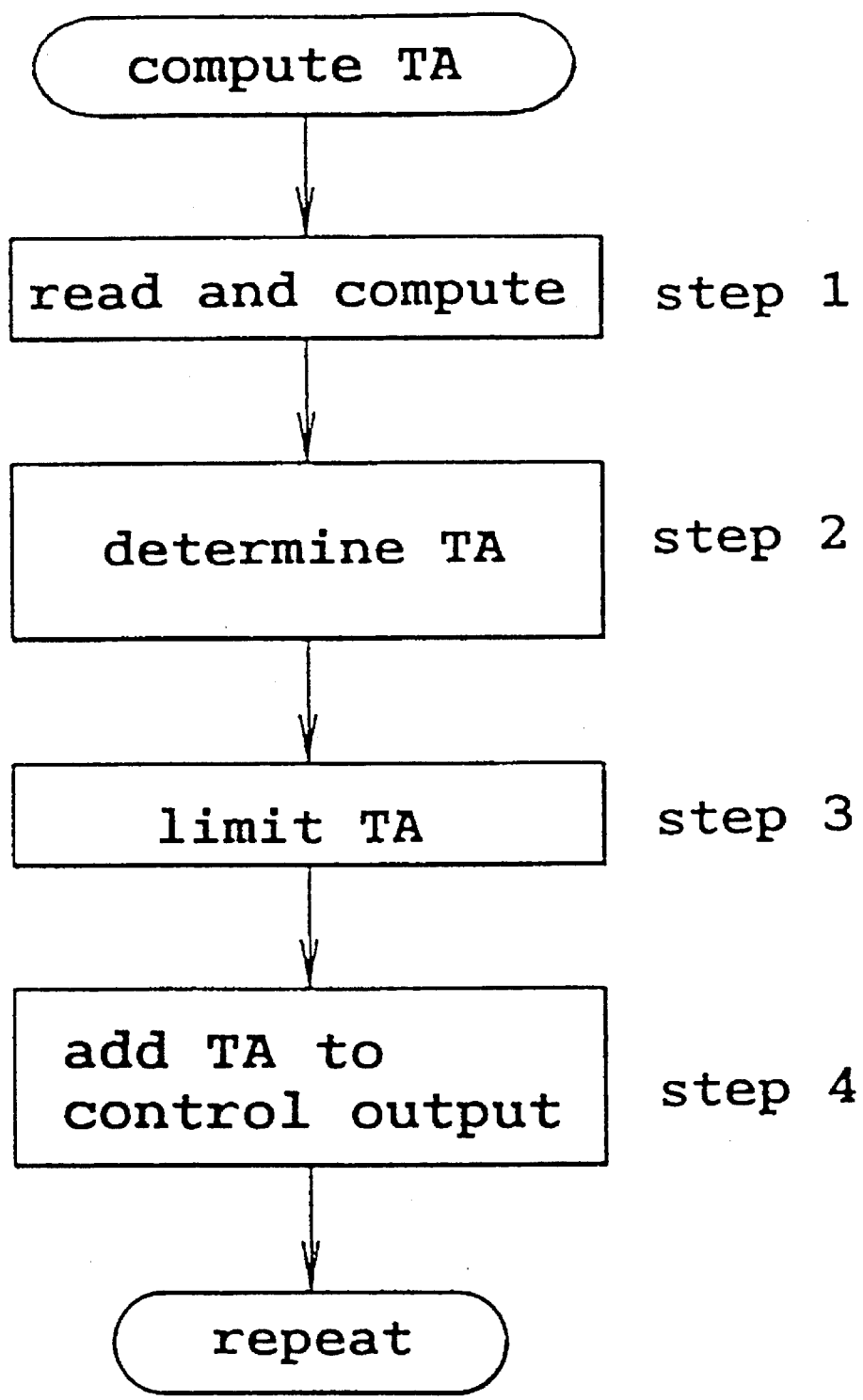
FIGS. 3 through 6 are flow chart showing the control flow of the control system.
Figure 4:
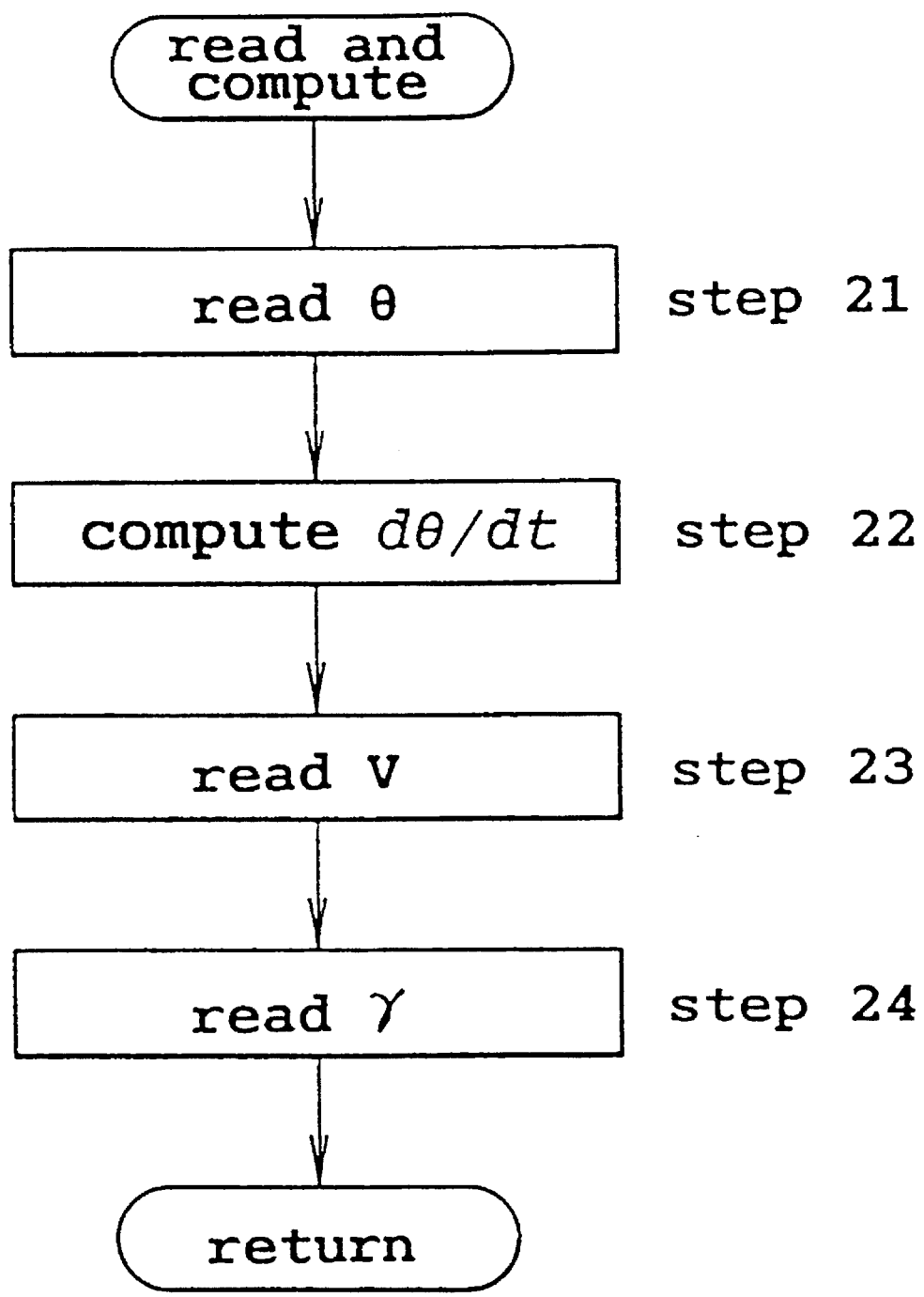

In the active steering reaction computing means 23 of the control unit 20, the process shown in the flow chart of FIG. 3 is executed at a prescribed interval. First of all, the signals from the various sensors are read and the steering angular speed and the yaw rate deviation are computed in step 1. The steering reaction TA is determined in step 2, and a limit is imposed on the target steering reaction TA in step 3. This control signal is then added to the output from the electric power steering control means 22 in step 4.

This process is described in more detail with reference to FIGS. 4 through 7. In step 1, the following sub steps are carried out. First of all, referring to FIG. 4, the steering angle θ is read (step 21), and this signal is differentiated with time to compute the steering angular speed dθ/dt (step 22). Then, the vehicle speed V and the yaw rate γ are read (steps 23 and 24).

Figure 5:
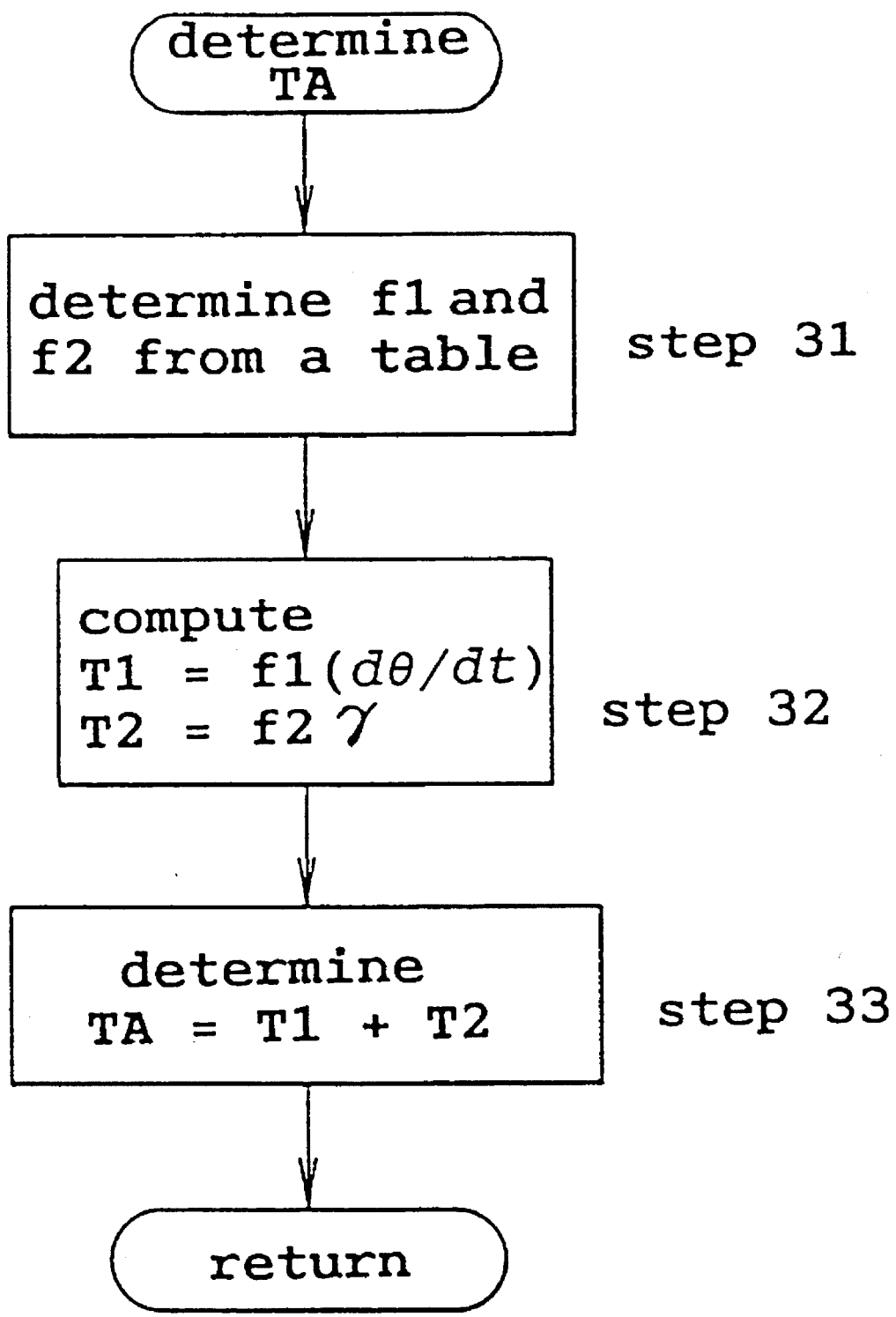

In step 2, referring to FIG. 5, coefficients f1 and f2 corresponding to the steering angular speed dθ/dt and the yaw rate γ are looked up from a data table having the vehicle speed as its address (step 31), two components of a steering reaction T1 and T2 are computed from these variables (step 32), and the two components of the steering reaction T1 and T2 are added to each other to determine the target steering reaction TA (step 33).

Figure 6:
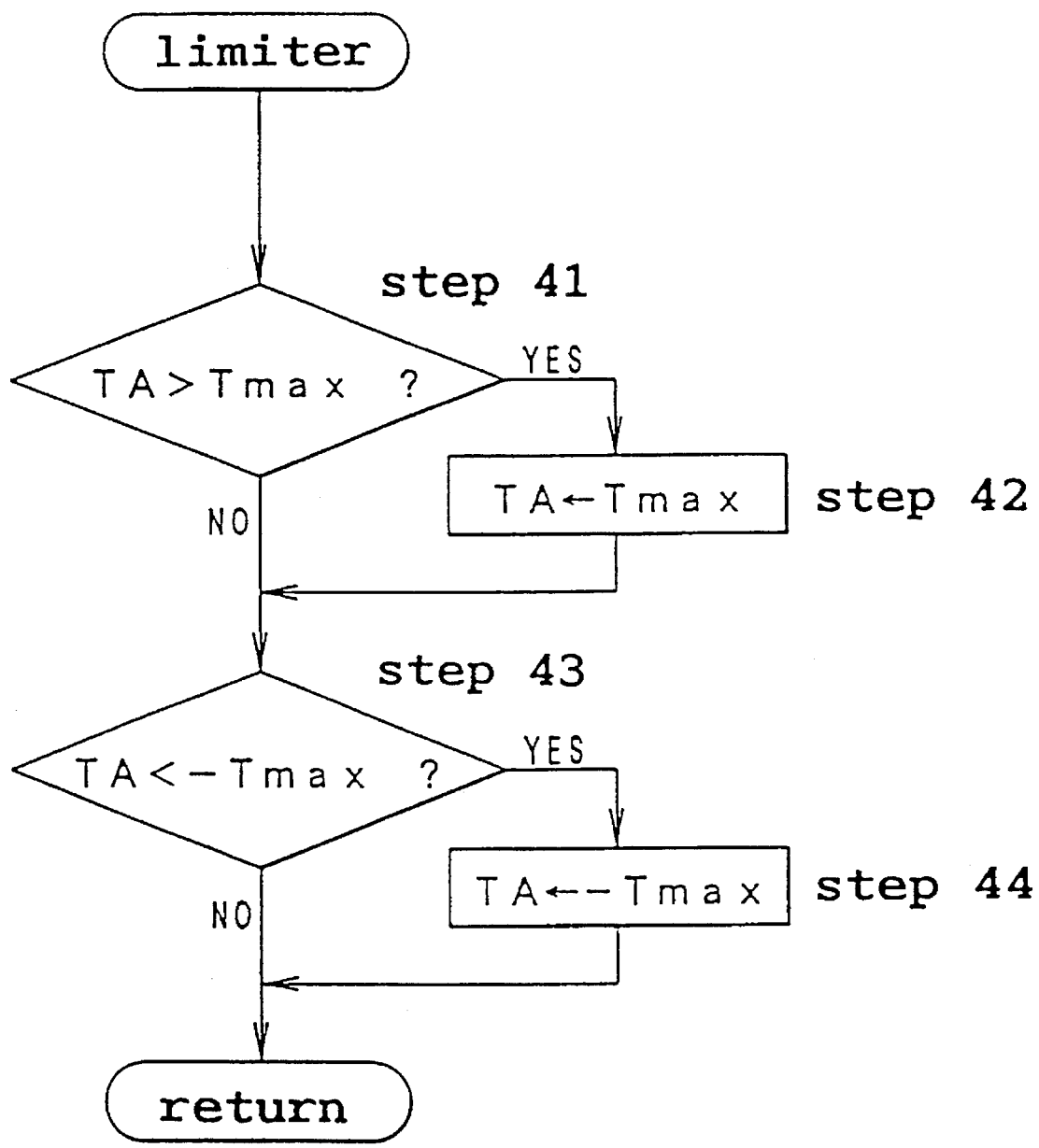

In step 3, referring to FIG. 6, it is determined if the target steering reaction TA exceeds a prescribed value (Tmax) or not (step 41), and if the target steering reaction TA exceeds the prescribed value, the target steering reaction TA is set at Tmax (step 42). If the target steering reaction TA is less than the prescribed value (Tmax), it is similarly determined if the target steering reaction TA falls below a prescribed value (−Tmax) or not (step 43), and if the target steering reaction TA is less (larger in the absolute value) than the prescribed value, the target steering reaction TA is set at −Tmax (step 44). The process executed in steps 41 through 44 correspond to the function of the limiter L in FIG. 7.

Figure 7:
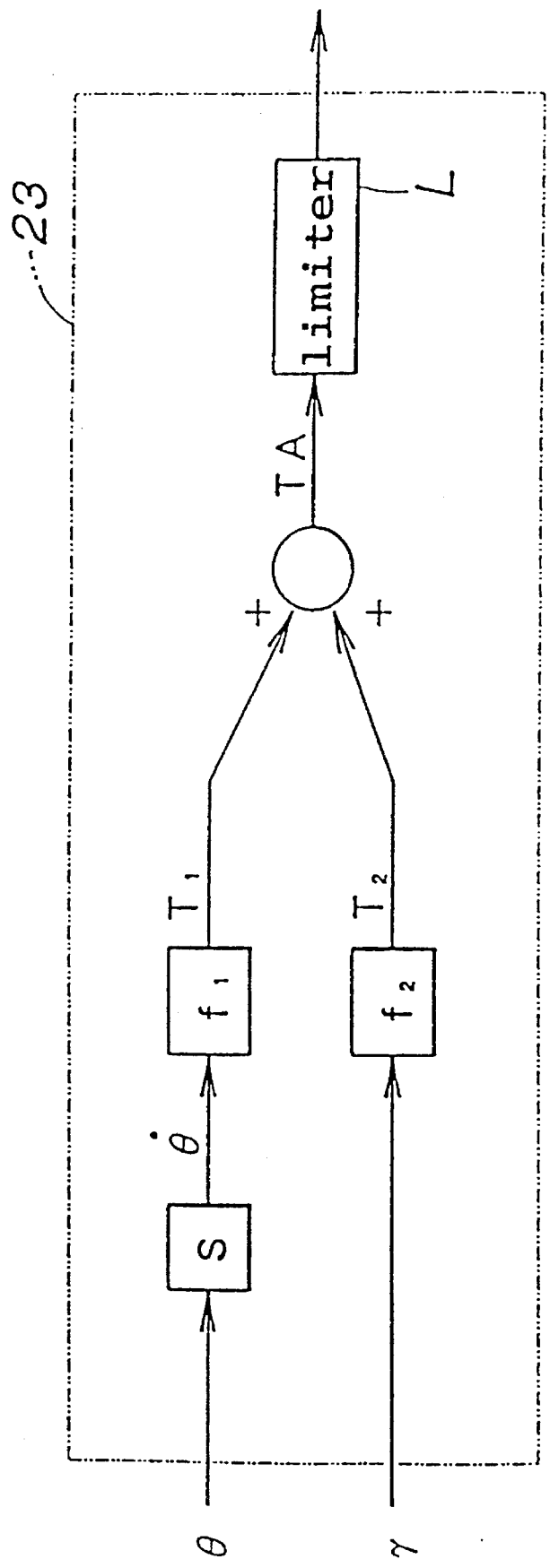
FIG. 7 is a block diagram showing a part of the control system.

The above described control action is summarized in the flow diagram of FIG. 7. The thus determined target steering reaction TA is added to the target assisting steering torque computed separately, and is converted into a target current value by the output current determining means 24 which is then supplied to the drive circuit 21.

Figure 8:
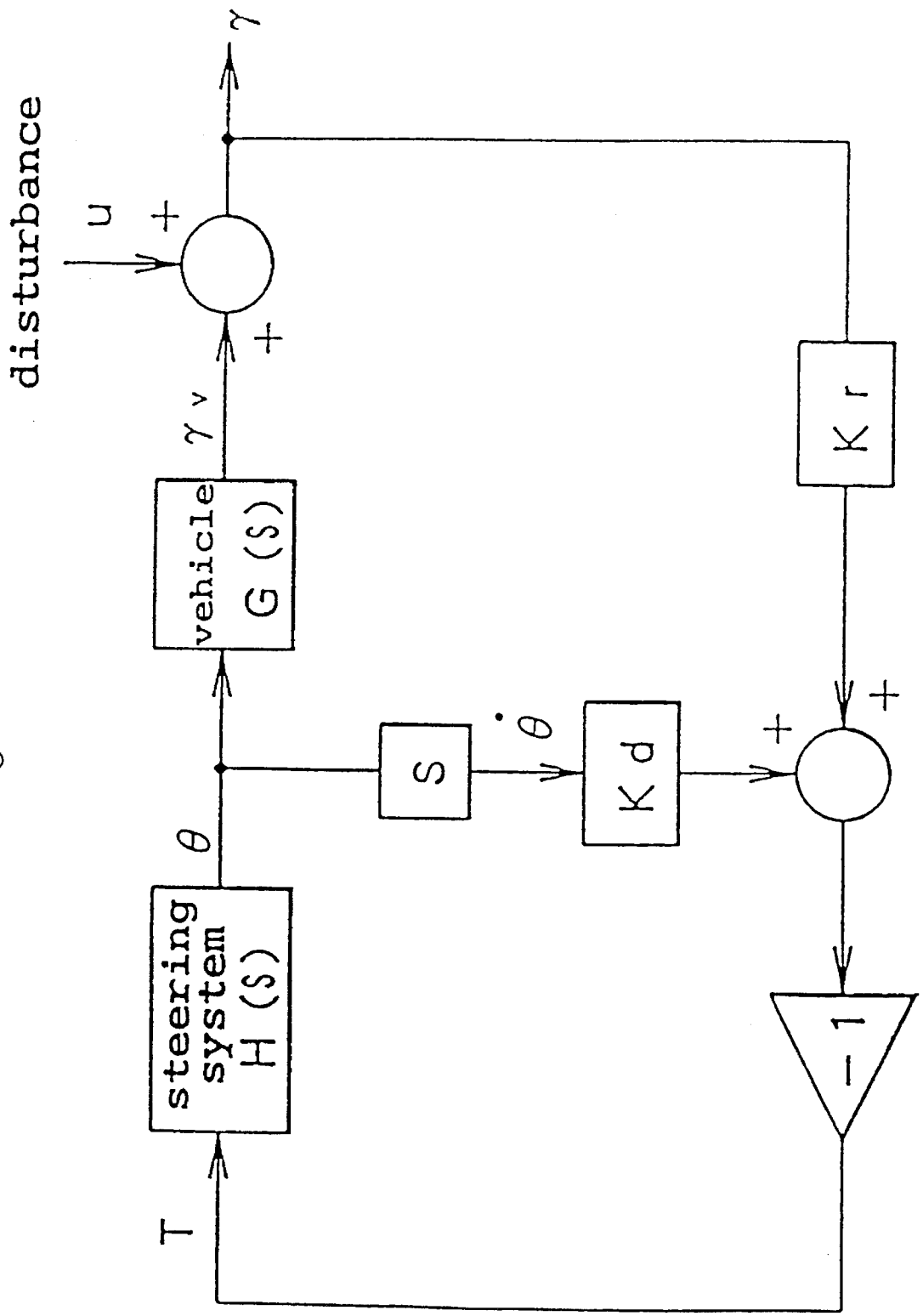
FIG. 8 is a block diagram showing a model for representing the dynamic behavior of the vehicle.
Figure 9:
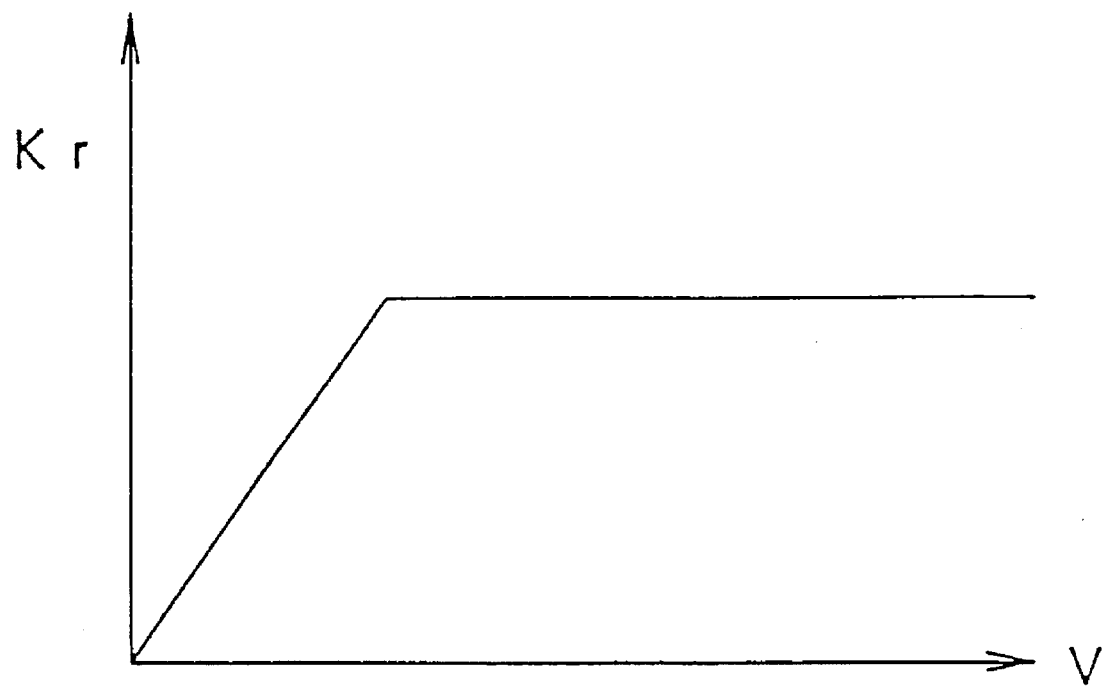
FIG. 9(a) and 9(b) show graphs of the control parameters used in the control system of the present invention.
Figure 9:
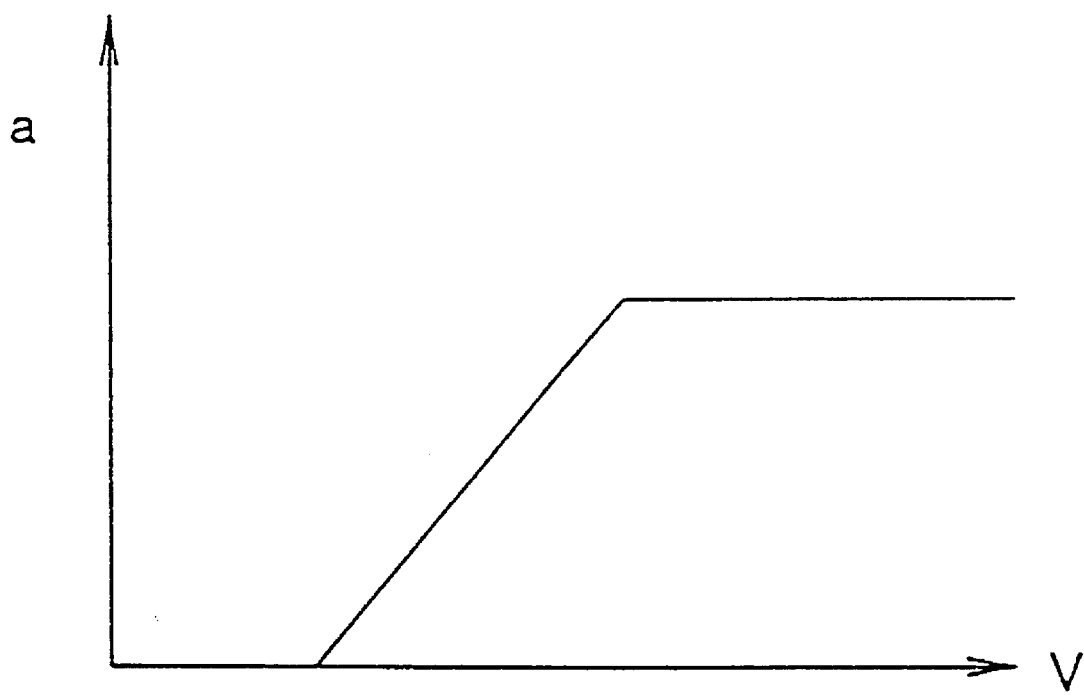

With regard to the model shown in FIG. 8, the transfer function of the system which produces the yaw rate γ from the external disturbance u can be given by the following function.

$$\gamma/u = 1/[1 + \{G/s(s \cdot J/Kr + Kd/KR)\}] \tag{1}$$

According to the previous proposal, the control coefficient Kr for the yaw rate and the damping coefficient Kd for the steering angular speed were separately selected, and changing one of them caused a need to change the other. Here, it was found that J/Kr is substantially smaller than Kd/Kr, and Equation (1) can be rewritten as given in the following.

$$\gamma/u \approx 1/[1+\{G/(s \cdot Kd/Kr)\}] \quad (2)$$

Thus, if Kd/Kr is constant, a certain attenuating response of the steering system can be attained without regard to the individual values of Kd and Kr.

Because the steering reaction TA can be given by the following;

$$TA = \gamma \cdot Kr + Kd \cdot (d\theta/dt) = (\gamma + a \cdot d\theta/dt) \cdot Kr$$

by setting the relation between the control coefficient Kr for the yaw rate and the damping coefficient Kd for the steering angular speed as Kd=a·Kr, it is possible to achieve an optimum attenuating property simply by changing the value of the coefficient of proportionality a without adjusting the damping coefficient Kd for the steering angular speed whenever the control coefficient Kr for the yaw rate is changed.

Generally, the control coefficient Kr for the yaw rate is zero when the vehicle speed V is zero, and increases linearly with the increase in the vehicle speed. The control coefficient Kr eventually saturates with the increase in the vehicle speed, and takes a substantially constant value when the vehicle speed becomes greater than a certain value. The constant of proportionality a is zero until the vehicle speed reaches a certain level, and after increasing linearly with the vehicle speed, eventually reaches a constant value when the vehicle speed increases beyond a certain limit. Thus, the steering system of the invention favorably avoids producing a steering reaction torque when the vehicle is turned by a turn-table used in a parking garage, and avoids unduly increasing the input torque required for steering maneuver in a low speed range by not applying an excessive damping to the assisting steering torque.

Thus, according to the present invention, when the vehicle shows a tendency to deviate from a straight ahead path due to a strong crosswind and other disturbances, the electric motor 10 is actuated so as to cancel the yaw rate of the vehicle, or so as to restore the vehicle back to the straight ahead course. Therefore, even when the vehicle experiences a disturbance, and a certain yaw rate is produced in the vehicle, the front wheels 9 are automatically steered so as to bring the vehicle back to the straight ahead course even if the vehicle operator does not firmly hold on to the steering wheel. Thus, the behavior of the vehicle can be substantially stabilized.

As described above, the present invention simplifies the control logic for producing a steering torque which tends to control the behavior of the vehicle. More specifically, the determination of the various parameters is simplified, and the steering reaction torque can be easily computed with the result that the amount of computation needed to be executed by the CPU is reduced.

Furthermore, because each parameter can be adjusted without affecting other parameters, the overall system design is simplified. If the various coefficients are selected so as to be zero when the vehicle speed is zero, there will be no steering reaction in an extremely low speed range. If the damping coefficient is restricted in a low speed range, the function of the power steering system can be preserved in a low speed range.

Although the present invention has been described in terms of a specific embodiment thereof, it is possible to modify and alter details thereof without departing from the spirit of the present invention.

What is claimed is:

1. A vehicle steering system, comprising:

manual steering means including a steering wheel for manually steering steerable wheels of a vehicle;

power means for applying a steering torque to said steerable wheels; and control means for controlling said steering torque produced by said power means according to a value indicating a lateral dynamic behavior of said vehicle so as to control said lateral dynamic behavior of said vehicle against external disturbances;

said lateral dynamic behavior including at least one of a yaw rate and a lateral acceleration of said vehicle, and said steering torque being given by a mathematical function including a sum of a first term consisting of a product of said value indicating a lateral dynamic behavior of said vehicle and a first coefficient, and a second term consisting of a product of an angular speed of said steering wheel and a second coefficient.

2. A vehicle steering system according to claim 1, wherein said first coefficient and second coefficient are variable in a mutually proportional relationship.

3. A vehicle steering system according to claim 2, wherein said first coefficient changes in dependence on a travelling speed of said vehicle.

4. A vehicle steering system according to claim 3, wherein said first coefficient linearly increases with a travelling speed of said vehicle in a low speed range, and takes a fixed value when said travelling speed of said vehicle exceeds a certain value.

5. A vehicle steering system according to claim 2, wherein a proportional constant between said first and second coefficients changes in dependence on a travelling speed of said vehicle.

6. A vehicle steering system according to claim 5, wherein said proportional constant is zero in a low speed range, linearly increases with a travelling speed of said vehicle in a medium speed range, and takes a fixed value when said travelling speed of said vehicle exceeds a certain high value.

7. A vehicle steering system according to claim 1, wherein said steering torque given by the mathematical function including the sum of the first term and the second term is a steering reaction torque.

8. A vehicle steering system according to claim 7, wherein said steering torque further includes a steering assist torque which is combined with said steering reaction torque, said control means including a power steering control means for determining said steering assist torque and a steering reaction computing means for determining said steering reaction torque.

* * * * *

UNITED STATES PATENT AND TRADEMARK OFFICE
CERTIFICATE OF CORRECTION

PATENT NO. : 5,481,457
DATED : 02 January 1996
INVENTOR(S) : Yorihisa Yamamoto, Yutaka Nishi, Takashi Nishimori, Hiroyuki Tokunaga It is certified that error appears in the above-indentified patent and that said Letters Patent is hereby corrected as shown below:

On the title page, in the section entitled "References Cited", under "FOREIGN PATENT DOCUMENTS", please add --3277023 Japan--.

Column 4, line 67 (last line), change "{]" to --}]--.

Column 5, line 37, change "maneuver" to --maneuvers--.

Signed and Sealed this

Sixteenth Day of April, 1996

Attest:

BRUCE LEHMAN

*Attesting Officer*  *Commissioner of Patents and Trademarks*